Feb. 5, 1924.

P. COHEN 1,482,385

SHIRT STUD

Filed May 9, 1923

Inventor,
Philip Cohen,
by Geyer & Geyer
Attorneys.

Patented Feb. 5, 1924.

1,482,385

UNITED STATES PATENT OFFICE.

PHILIP COHEN, OF BUFFALO, NEW YORK.

SHIRT STUD.

Application filed May 9, 1923. Serial No. 637,718.

*To all whom it may concern:*

Be it known that I, PHILIP COHEN, a citizen of the United States, residing at Buffalo, in the county of Erie and State of New York, have invented new and useful Improvements in Shirt Studs, of which the following is a specification.

This invention relates to improvements in shirt studs.

One of its objects is to provide an inexpensive stud of this character which is simple and compact in construction and which can be readily applied and removed.

Another object of the invention is to produce a stud which will retain the flaps of the shirt neatly together, and which is so constructed that its parts are not liable to work loose or become disconnected from one another.

A still further object is to provide the stud with means for preventing its rotation when in position in the shirt.

Figure 1:
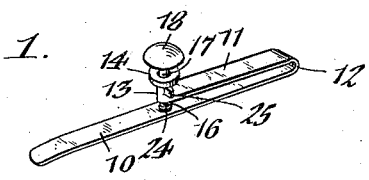
Figure 2:
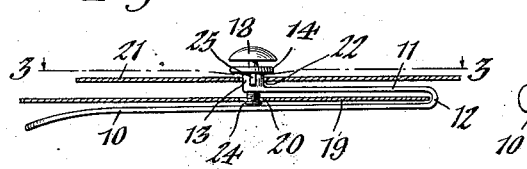
Figure 3:
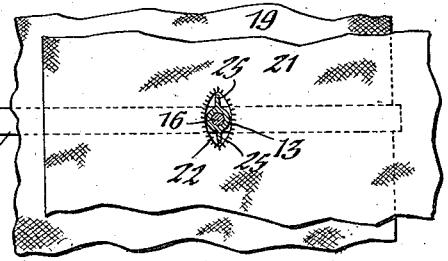
Figure 4:
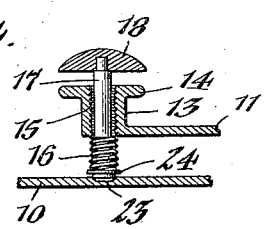
Figure 5:
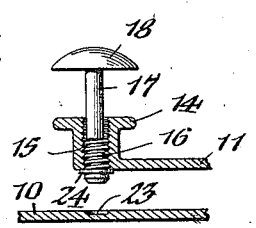

In the accompanying drawings:

Figure 1 is a perspective view of a stud constructed in accordance with my invention. Figure 2 is an enlarged side elevation of the same, showing it applied to a shirt. Figure 3 is a horizontal section on line 3—3, Fig. 2. Figure 4 is an enlarged fragmentary detail sectional view, showing the retaining screw in its operative position. Figure 5 is a view, similar to Fig. 4, showing the retaining screw in its inoperative position.

Similar characters of reference indicate corresponding parts throughout the several views.

The body portion of the improved stud is of substnatially U-shape consisting of inner and outer parallel arms 10 and 11, respectively, preferably constructed of a single piece of flat material bent intermediate its ends, as shown at 12. The outer arm 11 is comparatively short while the companion inner arm 10 is relatively long, the latter extending beyond the corresponding free end of the outer arm a distance approximately equal to or greater than the total length of such last-named arm. Projecting outwardly from the free end of the latter is a comparatively low neck or bearing portion 13 terminating in an annular flange or stop-collar 14. This neck is provided with a transversely threaded-bore 15 for receiving a retaining screw 16 which is adjustable across the space between the stud-arms. As shown clearly in Fig. 4, this screw is only threaded at its inner end, preferably a distance equal to the space between the arms 10, 11, while its reduced stem 17 passes freely through the threaded bore of the bearing neck and is provided at its outer end with an ornamental head or cap 18. The latter, by preference, is somewhat larger in diameter than the collar 14, so as to conceal such part from view when the stud is in position in the shirt. In the position of the parts shown in Fig. 2, the inner flap 19 of the shirt-front occupies the space between the two arms 10, 11 with the inner end of the retaining screw engaging the corresponding button-hole 20, while the outer shirt flap 21 extends over the outer arm of the stud with the neck 13 engaging the button-hole 22 thereof.

The outer face of the inner arm is provided in line with the bore 15 of the outer arm with a recess or depression 23 into which the inner end of the retaining screw 16 is adapted to extend for relieving the same from lateral strain. Near its inner end this screw is provided with a stop collar 24 for preventing its complete withdrawal through the threaded-bore of the neck 13. In practice, this stop collar projects laterally but a slight distance beyond the threaded portion of the screw, so as not to interfere with the insertion and removal of the latter to and from the button-hole.

In the operative position of the parts shown particularly in Figs. 2 and 4, the threaded inner end of the screw 16 is wholly disengaged from the threaded-bore 15, the outermost thread of the screw constituting a shoulder which prevents the latter from accidentally unscrewing. For starting the screw thread into the threaded-bore of the neck 13, it is only necessary to exert a slight outward pull on the retaining screw.

To prevent the stud from turning in the button holes of the shirt, its neck is preferably provided with oppositely-extending radial ribs 25, which, as shown in Fig. 3, are disposed at right angles to the direction of length of the arms 10, 11, whereby said ribs are arranged lengthwise of the button-hole.

To apply the stud, unscrew the retaining screw 16 to the position shown in Fig. 5. Now insert the long inner arm 10 of the stud through the buttonhole 22 of the outer shirt-flap 21 until the closed end 12 is reached, and then move the stud in the opposite direction, threading the short outer arm 11 through said button-hole, so as to engage the neck of the stud therewith, the collar 14 preventing the latter from being forced completely through such button-hole. In this position, the stud is supported by the outer shirt-flap with its inner arm facing toward and extending beyond the edge of the latter, as shown in Figs. 2 and 3. The inner shirt flap is now admitted into the space between these stud arms, the front end of the inner arm constituting a guide for this purpose and the closed end 12 of the stud forming a stop for properly positioning the button-hole 20 of said inner flap in line with the retaining screw 16. The latter is now screwed into engagement with the recess 21, the inner end of the screw entering the buttonhole 20 and serving to hold the inner shirt flap in place relative to the outer flap. To release the inner flap, in taking off the shirt, simply unscrew the retaining screw and reverse the steps above described.

By constructing the stud as described, its application and removal to and from the shirt is effected with comparative ease, it being unnecessary to insert the hand between the shirt and the body of the wearer, thus avoiding wrinkling and soiling of the shirt during this operation. Furthermore, the construction and arrangement of the parts is such that they cannot become lost or disconnected from one another. It will be noted that the rear side of the inner stud arm 10 is free from objectionable projections that would be liable to tear the undergarments or press against the body of the wearer.

I claim as my invention:

1. A shirt-stud of the character described, comprising a pair of spaced arms joined at one end and open at the other end, an outwardly projecting neck formed on the free end of one of said arms for engagement with a button-hole of the outer flap of a shirt and terminating in a stop collar for the latter, and adjustable retaining means mounted on said neck and adapted for movement across the space between said arms for engagement with an alining buttonhole of the inner shirt-flap.

2. A shirt-stud of the character described, comprising a pair of spaced arms joined at one end and open at the other end, an outwardly projecting bearing portion formed on the free end of one of said arms for engagement with a buttonhole of the outer flap of a shirt and terminating at its outer end in an integral stop collar for said flap, and a non-removable retaining screw mounted on said bearing-portion and adjustable across the space between said arms for engagement with an alining buttonhole of the inner shirt-flap.

3. A shirt-stud of the character described, comprising a pair of spaced arms of unequal length joined at one end, the longer arm being substantially twice as long as the shorter arm, an outwardly projecting neck arranged at the free end of the short arm, and an adjustable retaining device mounted on said neck and adapted for movement across the space between said arms.

4. A shirt-stud of the character described, comprising inner and outer spaced arms joined at one end, an outwardly-projecting neck having a threaded bore arranged at the free end of said outer arm and provided with a stop collar at its outer end, the inner arm having an alining recess in the side thereof facing said threaded-bore, the opposite side of said last-named arm being free from surface projections, and a retaining screw engaging the bore of said neck and adjustable across the space between said arms, the inner end of said screw being adapted to enter the recess in the inner arm.

5. A shirt-stud of the character described, comprising a pair of spaced arms joined at one end, an outwardly projecting neck arranged at the free end of one of said arms and having a radially disposed rib extending from its side for engagement with a buttonhole of a shirt, and a retaining device mounted on said neck and adjustable across the space between said arms.

6. A shirt-stud of the character described, comprising inner and outer spaced arms of unequal length joined at one end, the longer inner arm being substantially twice as long as the outer shorter arm, an outwardly projecting neck having a threaded bore arranged at the free end of the outer arm and provided with a stop collar at its outer end, said neck also having radially disposed ribs arranged crosswise of the stud, the inner arm having an alining recess in the side thereof facing said threaded-bore, the opposite side of said last-named arm being free from projections, and a retaining screw engaging the bore of said neck and adjustable across the space between said arms, the inner end of said screw being adapted to enter the recess in the inner arm.

7. A shirt-stud of the character described, comprising a pair of spaced arms joined at one end for receiving a shirt-flap between them, an outwardly projecting neck terminating in a stop collar and having a threaded-bore arranged at the free end of one of said arms, and a retaining screw arranged in said bore and adjustable across the space between said arms into and out of engagement with the button-hole of said shirt-flap, the end of said screw having a stop for preventing the total withdrawal thereof through the threaded-bore.

8. A shirt-stud of the character described, comprising a pair of spaced arms joined at one end, an outwardly projecting neck having a threaded-bore arranged at the free end of one of said arms, and a retaining screw having a threaded portion and a reduced stem passing freely through said bore, the length of the threaded portion of said screw being substantially equal to the space between said arms, said screw being wholly out of engagement with the bore of said neck when in its operative position.

PHILIP COHEN.